United States Patent [19]

Evans, Sr.

[11] Patent Number: 5,441,754

[45] Date of Patent: Aug. 15, 1995

[54] HIGH VOLUME SINGLE COLOR COTTON CANDY MACHINE

[75] Inventor: John C. Evans, Sr., Cincinnati, Ohio

[73] Assignee: Gold Medal Products Co., Cincinnati, Ohio

[21] Appl. No.: 150,976

[22] Filed: Nov. 12, 1993

[51] Int. Cl.⁶ .............................. A23G 7/00; A23P 1/00
[52] U.S. Cl. ................................. 426/483; 99/483;
   219/386; 366/146; 425/9; 426/517; 426/660
[58] Field of Search ............... 426/517, 519, 660, 465;
   425/9; 99/348, 483; 219/214, 386, 429; 366/146

[56] References Cited

U.S. PATENT DOCUMENTS

| | | | |
|---|---|---|---|
| 1,489,342 | 4/1924 | Brent | 425/9 |
| 3,036,532 | 5/1962 | Bowe | 425/9 |
| 3,070,045 | 12/1962 | Bowe | 425/9 |
| 3,073,262 | 1/1963 | Bowe | 425/9 |
| 4,793,782 | 12/1988 | Sullivan | 425/9 |
| 4,872,821 | 10/1989 | Weiss | 425/9 |

Primary Examiner—George Yeung
Attorney, Agent, or Firm—Wood, Herron & Evans

[57] ABSTRACT

A cotton candy machine includes a spinner head having upper and lower spinner elements spaced apart at least by about ½ inch and defining with a spacer a common sugar chamber operatively communicating with each spinner element. Sugar from the common chamber is directed to each element where it is heated and issues from the head in molten form. Upper and lower apertures of the apparatus are at least about ⅜ inch from respective apertures in other spinner element. The number of same size servings for the same initial amount of sugar is substantially increased over prior heads with elements or apertures not so spaced apart, while energy requirements are at the same time substantially decreased. Apparatus and methods are disclosed.

21 Claims, 2 Drawing Sheets

HIGH VOLUME SINGLE COLOR COTTON CANDY MACHINE

BACKGROUND OF THE INVENTION

This invention relates to cotton candy machines and more particularly to improved cotton candy machines for increasing production of cotton candy.

Cotton candy machines are well known. Typically such machines include a spinner or floss head for issuing fibers of molten sugar. The spinner head is surrounded by a tub or bowl in which congealed or cooled fibers are collected as candy. A paper cone is manually introduced into the bowl between the spinner head and bowl and is twisted to collect a serving of the fluffy candy.

Spinner heads used in such machines today typically include a slotted or perforated band forming a ring and defining a chamber into which sugar is poured. A ribbon-like, perforate heating element is disposed in ring-like form internally of, but adjacent the slotted band. When heated, the heating element melts the granular sugar flung against it by the spinning motion of the head. Molten sugar moves through openings in the heating element and issues from the slots in the band as molten fibers. These fibers cool and congeal on their way toward the surrounding bowl and may be captured by the bowl or collected as candy floss on a paper cone interjected therebetween. One such apparatus is described in U.S. Pat. No. 1,489,342.

It is also common to use an upper and lower floss band and heating element assemblies for producing cotton candy. One such machine is shown in applicant's own U.S. Pat. No. 4,872,821 which is specifically incorporated herein by reference. In this machine, the upper and lower floss bands are disposed adjacently, one atop the other. Each band has a plurality of inclined slots and the slots in one band are spaced from their counterpart or juxtaposed slots in the other band about $\frac{3}{8}''$. In use, both heater elements are heated and sugar issues from both bands. The molten fibers from the upper and lower bands tend to coalesce while still molten, and produce a homogeneous, single color cotton candy floss product.

It has also been known in the past to produce multiple color cotton candy using variations on the single color floss head assembly. For example, in Bowe Pat. No. 3,036,532, one floss band is stacked on another floss band to define two separate sugar chambers. The respective bands define outlets from the two separate sugar chambers each filled with a different color sugar. The heads are alternatively heated to alternatively produce cotton candy in varied colors, which can be collected on a paper cone as a striped cotton candy serving.

Another attempt at making two color cotton candy is illustrated in Bowe U.S. Pat. No. 3,073,262. Two similar spinner or floss heads defining two separate sugar chambers are spaced apart axially. Air vanes are disposed between the heads. These vanes discharge a flat stream of air radially in a horizontal plane which keeps the sugar filaments from each head separate from the filaments of the other head, all to produce two distinctive colors.

Yet another attempt to produce multiple color cotton candy is disclosed in Sullivan U.S. Pat. No. 4,793,782. Two stacked spinner heads defining separate sugar chambers are separated by an intermediate disk-like "stripe enhancer". Similar disk-like "enhancers" are disposed axially at the respective ends of the heads. The intermediate "enhancer" serves to maintain distinct colors externally of the chamber. Color separation is maintained and enhanced by all the enhancers. Together, they function to prevent undesired axial spread of the melted sugar exiting from each of the heads. As a result, confectionery fluff on the inside of the associated tub wall can be gathered to form striped cotton candy.

While these multiple color candy devices may be suitable for producing striped cotton candy, they are not disclosed as being particularly useful or helpful in producing single color cotton candy. For example, if the multiple heads are all used with only one sugar color, there is no disclosure of the efficacies of the machines to produce single color cotton candy, nor of their ability to do so practically. Use of only one of the heads, or the filling of both chambers with a single color would be required.

When applicant's prior multiple band single color machine, as shown in U.S. Pat. No. 4,872,821, is operated, molten sugar issuing from the two adjacent bands is believed to coalesce prior to its cooling or congealing. A single, homogeneous fibrous mass of candy is produced. While effective for single color production, the ineffectiveness of this apparatus to produce striped or multiple color candy is exhibited by the disclosures of the other patents noted above which rely on separation of the sugar both within and issuing from the multiple heads. Accordingly, it is believed these multiple color devices are considered improvements over the apparatus of U.S. Pat. No. 4,872,821 only in the context of the production of two-color cotton candy, and that they are not relevant to enhanced or efficient production of single color cotton candy.

It is an objective of this invention to provide improved apparatus and methods for the production of single color cotton candy.

A further objective of this invention has been to provide improved apparatus and methods for more efficiently producing single color cotton candy.

A further and more specific objective of this invention has been to provide improved apparatus and methods for increasing production of cotton candy from a measured base amount of sugar.

A still further objective of this invention has been to provide improved methods and apparatus for making cotton candy which reduces the heat required for its manufacture.

To these ends, a preferred embodiment of the invention includes a single color cotton candy machine having a tub and a spinner head comprising two slotted floss bands, each having a heater unit, such as that disclosed in U.S. Pat. No. 4,872,821, which is incorporated herein by reference. One floss band is axially spaced from the other by about one-half inch or more, but without any mechanical or fluid stream producing means for separating the molten sugar issuing therefrom. A ring-shaped spacer is disposed between the two bands and separates them about $\frac{1}{2}$ inch or more. Since the slots in each band are spaced about 3/16 inch from the edge thereof, this spaces the respective slots in one band about $\frac{7}{8}$ inch from the respective slots in the other band.

The upper and lower bands and the spacer define a single internal common chamber for receiving a homogeneous fill of sugar which can flow to each heater and band for emission from apertures therein.

The spacer has an external surface generally in the same cylindrical surface as the bands, and an internal surface which is tapered to an apex midway between the side faces of the spacer to help direct sugar from the common sugar chamber toward both bands.

When the head spins, sugar is flung outwardly toward the respective heating elements and bands where it is melted and issues in molten form from the slots in the bands. Since the bands and slots therein are spaced apart, coalescence of the molten sugar issuing from one band with that of the other band is delayed until the sugar begins to cool. This coalescence does not occur until the sugar is wholly or partly cooled and congealed, but it does occur generally before the sugar reaches the tub walls.

The results of this system are spectacular! For example, as compared to the machine in U.S. Pat. No. 4,872,821, when the head described above is used, production of same size cotton candy servings from the same amount of initial sugar is increased over 50%! Moreover, it has been discovered that the production cycle requires 16% less energy while at the same time producing many more same size servings' The invention thus substantially increases the number of same size servings of cotton candy from a measured base amount of sugar, while requiring substantially less energy to do so. Profits from machine operation increase substantially. Such results are unknown for prior cotton candy machines, including those patented devices described above.

Applicant's tests show that the phenomena described above begins to appear when the spacing between the bands approaches one half inch or more, thus spacing the band openings, i.e. those in the upper and lower bands, about ⅜ inches apart. When the band spacing is much less than one half inch, or slot spacing less than ⅜ inch, the phenomena is not present, or is substantially reduced. When the spacing between the slots increases over ⅜ inch, the phenomena still is retained, the upper limit apparently being dictated by tub size, motor shaft overhung load limits, or the practicalities involved in manually collecting candy on a paper cone.

These and other objectives and advantages will become readily apparent from the following detailed description of a preferred embodiment of the invention and from the drawings in which.

Figure 1:
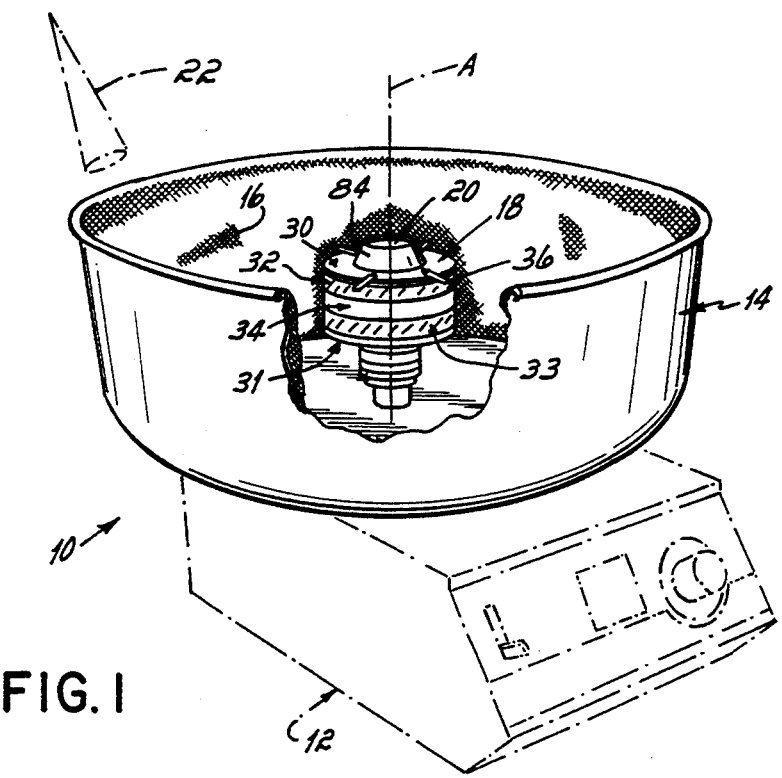
FIG. 1 is a perspective view of a single color cotton candy machine according to the invention.

Turning now to the drawings, there is illustrated in FIG. 1, a cotton candy machine 10, including a motor supporting base 12, a collecting bowl or tub 14 having a mesh candy collector or liner 16 therein, and a spinner head 18 comprising two floss bands 32, 33, preferably disposed on the center axis A of the bowl 14. The base 12 is provided with a series of controls and mounts a motor (not shown) for rotating the spinning head 18 about the axis A. In use, sugar is poured into an opening 20 in the head 18. The head 18 is spun while, at the same time, heated to melt the sugar and fling it outwardly toward the mesh candy collector 16. A paper cone 22 can be inserted between the mesh liner 16 and the spinner head 18 for collecting cotton candy thereon for consumption.

Figure 2:
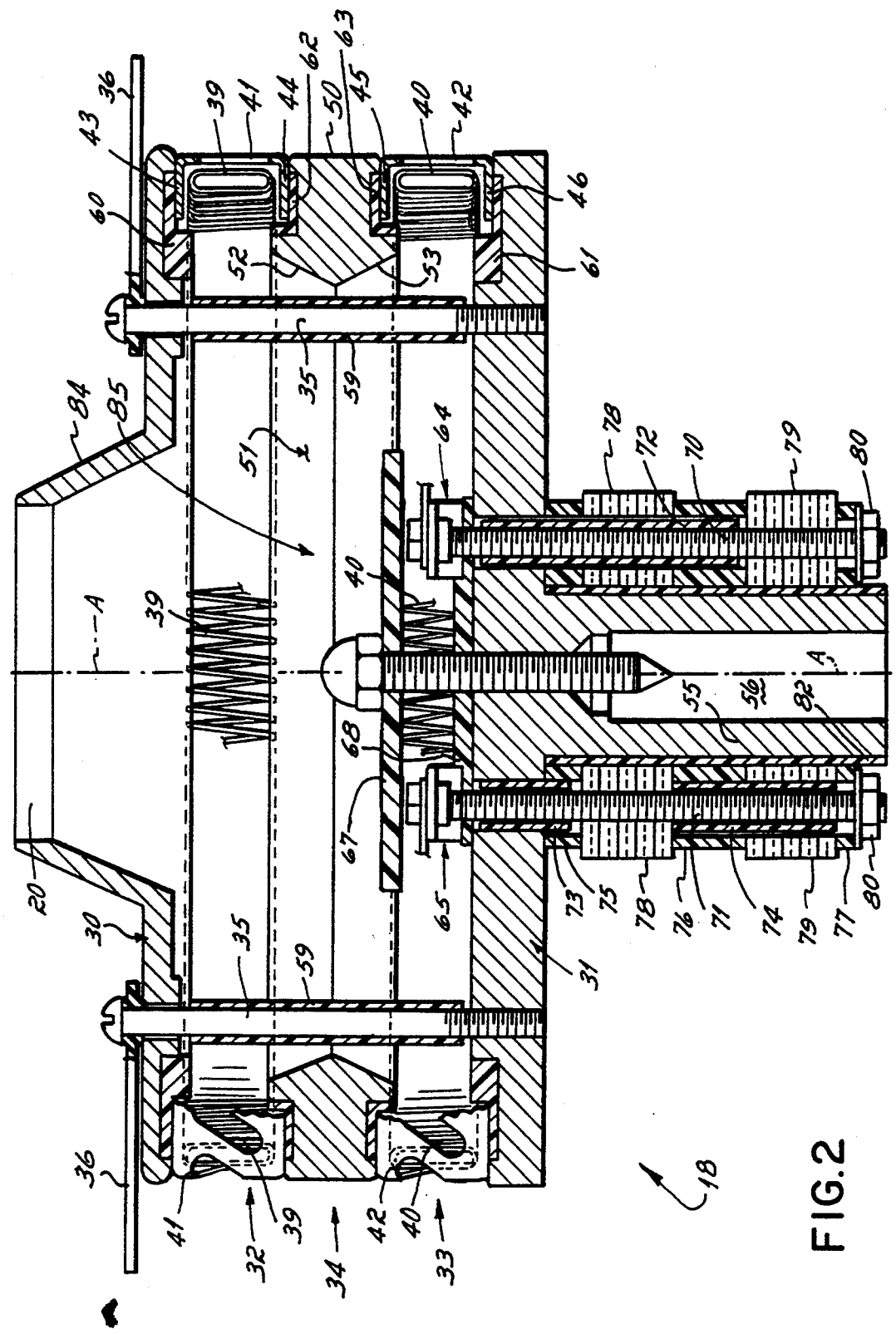
FIG. 2 is a cross sectional view of the floss head of FIG. 1 according to the invention.

Turning now to FIG. 2, the details of the spinner head 18, according to the preferred embodiment of the invention are illustrated therein. The spinner head 18 includes a spinner cap 30 and a head casting 31. Sandwiched between the spinner cap and the head casting are an upper spinner element or floss band 32, a lower spinner element or floss band 33 and a spacer 34 therebetween. This assembly is held together by screws 35 which also mount leather floaters 36 on the top of the spinner cap.

Each of the upper and lower spinner elements or floss bands 32, 33 are backed up by respective internal heater elements 39 and 40. Each of the bands 32, 33 are provided with a plurality of inclined slots 41, 42 which comprise openings or apertures through the band. Each band has respective upper and lower flanges 43, 44 on band 32 and 45, 46 on band 33. These flanges are turned inwardly and extend in a radial direction with respect to the axis A to define side annular inner faces of bands 32, 33. The ends of the slots in each band 32, 33 are spaced about 3/16 inch from the side face, or end, of the band.

Figure 3:
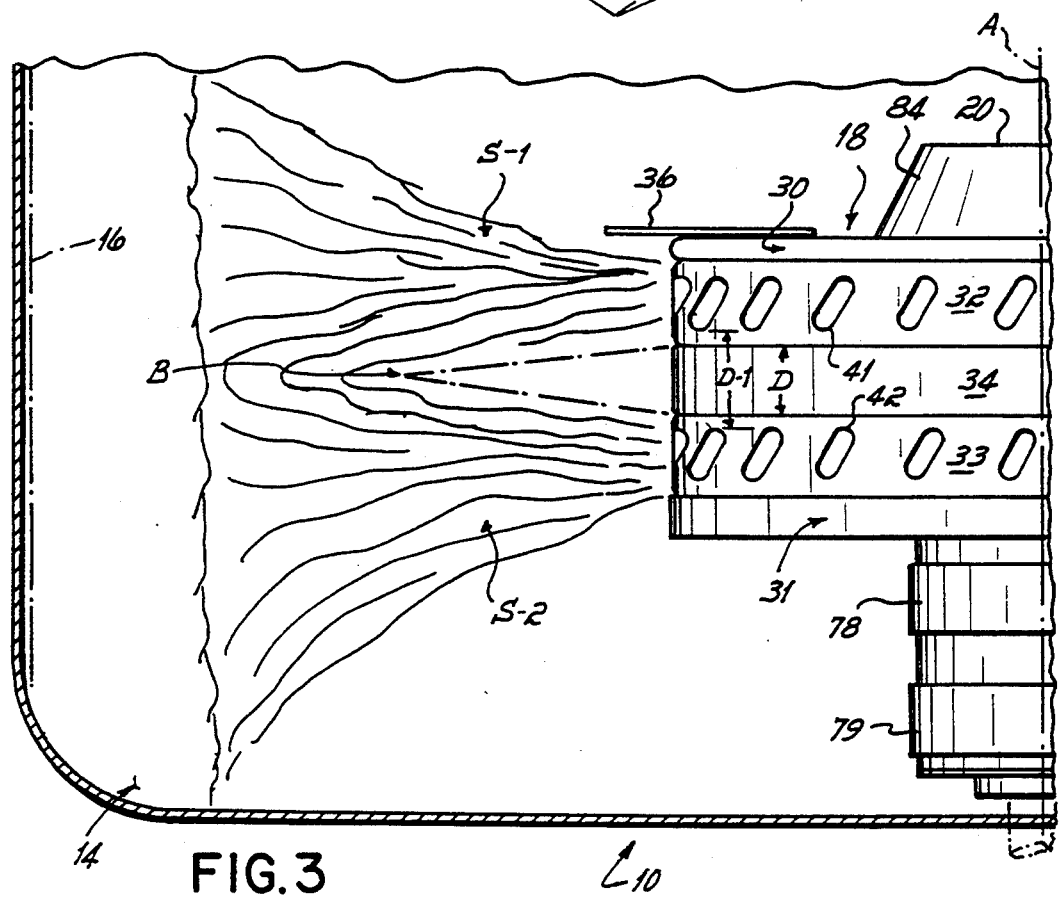
FIG. 3 is an illustrative view demonstrating the issue of sugar from the head of FIG. 2.

Spacer 34 has an external circumferential surface 50 on the outer side thereof, and a tapered inner surface 51, comprised of surfaces 52 and 53, which incline from an apex of the inner surface 51 toward the outer side edges of the spacer 34, as shown. The outer periphery 50 of the spacer is in register with the outer periphery of the bands 32, 33. Spacer 34 is preferably about ½ inch wide in the dimension D as shown in FIG. 3. Alternatively, spacer 34 is greater than ½ inch, but not so wide as to exceed the overhung load limitations of the drive motor shaft, as will be further noted. Since the inclined slots in each band 32, 33 have ends about 3/16 inch from the flange faces of the spacer 34, the slots in band 32 are at least about ⅞ inch nominally from the respective or juxtaposed slots in band 33. Each band is about ⅞ inch wide. Preferably, each band (and spinner head) is about 7 inches in outside diameter, but could be either more or less, such as 5 inches, for example.

It should be appreciated that it is not necessary to have the slots in one band in exact register with the slots in the other band; they could be offset. Thus, the spacing of juxtaposed slots, whether in direct or offset register, is nominally at least about ⅞ inch.

The head casting 31 includes a boss 55 having a drive bore 56 extending therein. Drive bore 56 is shaped to accommodate a drive shaft (not shown) of a motor mounted on or in the base 12 (FIG. 1) for rotating the spinner head 18 about axis A.

Continuing now with further details of the spinner head 18, each of the screws 35 is provided with a phenolic stud insulator 59 to insulate the screws. An annular head gasket 60 is interposed between the spinner cap 30 and the upper annular band 32 for sealing the upper band to the spinner cap. A similar gasket 61 insulates the head casting 31 from the lower band 33. Band insulators 62, 63 insulate the spacer 34 from the bands 32, 33. Terminal assemblies 64, 65 are provided for interconnecting the heating elements 39 and 40 to a source of electrical energy, as will be further described. A phenolic terminal guard or deflection plate 67 is disposed above the terminal assembly 64, 65, while a phenolic terminal insulator 68 is disposed under the terminal assembly 64, 65 to insulate from the head casting 31.

Head studs 70, 71 are disposed beneath the terminal assemblies and extend downwardly alongside the boss 55. The head studs are surrounded by phenolic stud insulators 72, 73 and 74, respectively, as shown in FIG.

2, and the studs 70, 71 extend through top, center and bottom phenolic washers 75, 76 and 77 as well as through slip rings 78 and 79. The top phenolic washer 75 separates the slip ring 78 from the under surface of the head casting 31, while the intermediate or center phenolic washer 76 separates the slip rings 78, 79 and the bottom phenolic washer 77 separates the slip ring 79 from the nuts 80, securing the bottom ends of the head studs. The slip rings are further insulated from the head casting 31 and the boss 55 by means of an insulator sleeve 82.

Accordingly, it will be appreciated that the head stud 70 is insulated from the upper slip ring 78 and from the boss 55, but is in electrical contact with the lower slip ring 79. Alternatively, the head stud 71 is insulated from the lower slip ring 79, but is in electrical contact with the upper slip ring 78. Thus, the head stud 70 interconnects the lower slip ring 79 with the terminal assembly 64 while the head stud 71 interconnects the upper slip ring 78 with the terminal assembly 65. These terminal assemblies are operatively connected by wires (not shown) to the heaters 39, 40 which can be connected in parallel or series. The terminal assemblies 64, 65 are thus interconnected to the heater elements 39, 40 for charging the elements with electricity and causing them to heat up sufficiently to melt sugar. In use, it will be appreciated that the cotton candy machine 10 provides electrically conductive brushes (not shown) for sliding engagement with the respective slip rings 78, 79 in order to conduct electricity to and from the terminal assembly 64, 65.

It will be appreciated that the heater elements 39, 40 are flat, ribbon-like elements comprised of a plurality of wound or otherwise disposed elements having interstices therethrough. Sugar thrown against and toward the elements can be melted and can issue through the interstices of the element toward the bands 32, 33, respectively, and from where the sugar can then issue through slots 41, 42, respectively, and outwardly of the spinner head 18 toward the tub 14. It should also be appreciated that the spinner cap 30 includes a centrally located frusto-conical portion 84, which defines a single mouth 20 leading into a common sugar chamber 85 within the spinner head 18. The common sugar chamber 85 has its sides defined by the upper and lower bands 32, 33 and the spacer 50, so that each of the bands is common to and communicates with the single chamber 85. In other words, the floss bands 32, 33 and spacer 34 define a single or common sugar chamber communicating with each floss band 32, 33.

This structure is similar to the spinner head shown in U.S. Pat. No. 4,872,821, incorporated herein by reference, with the exception, of course, of the interposition of the spacer 34 between the upper and lower annular bands 32, 33, and the spacing of the slots at least about $\frac{7}{8}$ inch apart.

Moreover, it will be appreciated that the spinner head 18 described herein can be efficiently utilized in cotton candy machines such as those manufactured and sold under the trademarks "Tornado" and "Whirlwind" by the applicant, and which are otherwise well known in the industry, and in place of the spinner heads typically heretofore used on such machines.

Turning now to FIG. 2, there is illustrated therein a cross-sectional view of the relationship of the spinner head 18 with the tub 14. In use, a user loads common sugar chamber 85 by pouring sugar into the mouth 20 of the spinner cap 30. The sugar hits the terminal guard or deflection plate 67 and is spun off by centrifugal force, such that sugar in the chamber 85 is flung outwardly toward spacer 34 where it is directed by surfaces 52, 53 to the upper and lower periphery of the chamber 85. Thus, sugar engaging the inner surface 51 of the spacer 34 is directed by sloping surfaces 52, 53 toward the upper band 32 or the lower band 33. As the sugar moves toward the bands, it first engages the upper and lower heating elements 39, 40. When energized via the slip rings 78, 79, head studs 70, 71 and terminal assembly 64, 65, for example, the heater elements 39, 40 melt the sugar which moves through the interstices in the respective heater elements and outwardly of the spinning head through the slots 41, 42 in what is believed to be a molten fibrous form, such as illustrated diagramatically at S-1 and S-2 in FIG. 3. The leather floaters 36 are useful to help direct the cotton candy toward the side walls of the tub 14, as will be appreciated and is well known. The spacer 34, having the width D, which is about $\frac{1}{4}$ inch or greater, and spacing the slots apart a distance D-1 of at least about $\frac{7}{8}$ inch or greater, maintains the sugar S-1 and S-2 issuing from the respective bands 32, 33 apart for some distance, such as that represented by the apex B as shown in FIG. 3, until the molten sugar has had some time to cool and partially congeal. Thereafter, the sugar is carried as a homogeneous floss mass toward the tub 14 and, if used, the mesh candy collecting liner 16.

The head is regulated with the heat controls on the base 12, such that approximately 90 volts are utilized to heat the heaters 39, 40. This compares to the necessity to use approximately 105 volts in prior Tornado machines utilizing the dual element spinning head as shown in applicant's prior U.S. Pat. No. 4,872,821. Despite this reduction in heat, the output of the cotton candy machine using a spinning head 18 according to this invention as described herein, is spectacular! For example, the following Table I shows the results of four runs made with the same machine contrasting the invention with the prior art.

TABLE I

| | ALL RUNS INITIATED WITH 817 GRAMS OF SUGAR | | | |
|---|---|---|---|---|
| SERVING NO | PRIOR ART RUN NO. 1 7" HEAD DIAMETER NO FLOSS HEAD SPACER | RUN NO. 2 7" HEAD DIAMETER SPACER $\frac{1}{2}$" (D) SLOTS SPACE $\frac{7}{8}$" (D-1) | RUN NO. 3 7" HEAD DIAMETER SPACER $\frac{3}{4}$" (D) SLOTS SPACE 1-$\frac{1}{8}$" (D-1) | RUN NO. 4 7" HEAD DIAMETER SPACER 1" (D) SLOT SPACE 1-$\frac{3}{8}$" (D-1) |
| 1 | 39.8 | 30.2 | 32.9 | 33 |
| 2 | 53.6 | 22.4 | 32.5 | 28.7 |
| 3 | 33.6 | 32 | 25.2 | 25.3 |
| 4 | 30.7 | 34.4 | 22.4 | 21.8 |
| 5 | 35.6 | 28.5 | 27.1 | 26.9 |
| 6 | 39.6 | 28.6 | 23.2 | 22.8 |
| 7 | 36.4 | 31.5 | 21.3 | 21.4 |

TABLE I-continued

ALL RUNS INITIATED WITH 817 GRAMS OF SUGAR

| SERVING NO | PRIOR ART RUN NO. 1 7" HEAD DIAMETER NO FLOSS HEAD SPACER | RUN NO. 2 7" HEAD DIAMETER SPACER 1/2" (D) SLOTS SPACE 7/8" (D-1) | RUN NO. 3 7" HEAD DIAMETER SPACER 3/4" (D) SLOTS SPACE 1-1/8" (D-1) | RUN NO. 4 7" HEAD DIAMETER SPACER 1" (D) SLOT SPACE 1-3/8" (D-1) |
|---|---|---|---|---|
| 8 | 33.3 | 24.7 | 20.1 | 19.9 |
| 9 | 29.8 | 28 | 21.8 | 21.6 |
| 10 | 32.9 | 28.6 | 18.8 | 19.9 |
| 11 | 26.9 | 26.7 | 18.8 | 19 |
| 12 | 28.4 | 22 | 19.2 | 18.4 |
| 13 | 25.4 | 24.7 | 21 | 22.5 |
| 14 | 36.4 | 25 | 18.7 | 21 |
| 15 | 28.9 | 22.8 | 19.1 | 18.4 |
| 16 | 21.5 | 24.3 | 20.6 | 19.4 |
| 17 | 29.4 | 22.5 | 20.5 | 20 |
| 18 | 23.8 | 22.6 | 21 | 21.7 |
| 19 | 26.2 | 20.1 | 20.1 | 18.8 |
| 20 | 34 | 19.8 | 19.4 | 19.6 |
| 21 | 28 | 25.4 | 17.8 | 17.7 |
| 22 | 23.2 | 22.4 | 24 | 21 |
| 23 | 23.8 | 23.4 | 21.1 | 22.8 |
| 24 | 11.5 | 221.5 | 17 | 18.4 |
| 25 | | 26 | 18.7 | 17.5 |
| 26 | | 21.5 | 18.3 | 17.7 |
| 27 | | 19.4 | 20.8 | 21 |
| 28 | | 18.9 | 16.9 | 17.1 |
| 29 | | 18.7 | 17.1 | 18.9 |
| 30 | | 9.9 | 16.7 | 17.5 |
| 31 | | | 16.7 | 16.9 |
| 32 | | | 14.9 | 18.2 |
| 33 | | | 16.4 | 15.6 |
| 34 | | | 14.2 | 15.4 |
| 35 | | | 15.2 | 15 |
| 36 | | | 16 | 15.7 |
| 37 | | | 11.4 | 10.5 |
| MEASURED CANDY WEIGHT | 732.7 | 726.5 | 736.9 | 737 |

The first run tallies the results of making candy using the prior art twin element head of applicant's prior U.S. Pat. 4,872,821. Run No. 1 uses a 7" head. The second through the fourth runs tally results of making cotton candy with the floss heads of the invention herein spaced apart in varying amounts as shown. The same initial amount of sugar was used for each run, and each head was run at the same rpm speed. The prior art head of run no. 1 was run at the level of 105 volts while the other runs 2 to 4 were conducted at the level of 90 volts.

As the cotton candy was generated, it was collected on a paper cone 22 until it was ten inches in diameter and ran along the operative length of the cone. This was tested by passing the cotton candy serving through a ten inch diameter hole. Thereafter the cotton candy was wiped from the cone and weighed. As seen in the following Table I, the prior art head (Run No. 1) utilized 732.7 grams of sugar to produce 24 servings of this size. The spinner head 18 of Runs Nos. 3 and 4, however, utilized 736.9 grams and 737 grams of sugar to produce 37 servings the same size! Throwing out the last lightweight sample of serving 24 (Run No. 1) and serving 37 (Runs. Nos. 3 and 4) use of the new spinning head 18 resulted in approximately 56.6% more servings than the number of same size servings produced when the prior art head was utilized, all the while using approximately 16% less energy.

The spacer utilized in Run No. 3 was 3/4 inches thick, i.e. its D dimension as shown in FIG. 3 equals 3/4 of an inch, while the head was about 7 inches in diameter. The juxtaposed slots in the respective bands were 1 1/8 inch apart ("D-1" dimension). The spacer of Run No. 4 was 1 inch (i.e. "D"=1 inch) while the juxtaposed slots were 1 3/8 inches apart ("D-1").

While Run. No. 2 illustrates use of a 7 inch diameter head and a 1/2 inch spacer to space the slots at 7/8 inch apart and wherein increased production and efficiency of power are achieved as shown.

It will be appreciated that an alternative embodiment of the invention may include a single floss head having upper and lower series of circumferentially spaced apertures in a single wide band, and with the upper series of apertures spaced apart nominally from a lower series of apertures at least about 7/8 inch. There is no "spacer" since there is only a common band. Of course, the apertures in this or the preferred embodiment can take many shapes and sizes and can be oriented in different positions with respect to each other.

It will be appreciated that approximately the same amount of sugar was unaccounted for in each of the test runs and is believed to constitute sugar left in the head, for example.

Substantially increased numbers of servings and reduced energy begins to occur at a spacing between the bands of approximately 1/2 inch, or of slot spacing at about 7/8 inches apart, and may occur at slightly less than 1/2 inch and 7/8 inch slot spacing. The benefit continues from that point up past and greater than 1/2 inch band spacing or 7/8 inch slot spacing. The upper spacing limit, at which the production increases and power decreased are obtained, has not been determined, but is believed to be practically limited by the capacity of the motor for overhung load, the practical dimensions of the spinning head and tub, and the practicalities of gathering cotton candy manually on a paper cone.

Of course, as noted above, this embodiment might be modified within the scope of the invention to include a spinner head having a common outer wall with upper and lower circumferentially spaced apertures oriented about at least ⅞ inches apart, respectively. Such a construction may be used in place of the two floss bands described above.

Applicant preferably uses a floss sugar such as that ready-to-use floss sugar manufactured and sold by Gold Medal Products of Cincinnati, Ohio, under the mark, "flossugar" in numerous flavors and colors. Any suitable sugar might be used.

Accordingly, the invention provides apparatus and methods for producing cotton candy and for substantially increasing the efficiency of the production by producing more cotton candy from base amounts of sugar while using less electrical energy to do so. These and other advantages and modifications will become readily apparent to those of ordinary skill in the art without departing from the scope of the invention and the applicant intends to be bound only by the claims appended hereto:

We claim:

1. Apparatus for making single color cotton candy, said apparatus comprising:
   a candy spinning head mounted for rotation about an axis and having upper and lower spinner elements each including a sugar melting heater and a perforated band disposed externally of said heater;
   a spacer between said elements spacing said elements apart;
   said elements and said spacer together defining in part a common sugar chamber for receiving sugar and from which sugar is dispensed toward the heater of each element for melting and issuing therefrom as cotton candy;
   said spacer spacing said bands apart not less than about ½ inch.

2. Apparatus as in claim 1 wherein said spinning head defines a single port for receiving sugar into said common chamber.

3. Apparatus as in claim 1 wherein each band includes a plurality of inclined slots and wherein the portions of slots in one band closest to portions of slots in the other band are spaced apart therefrom at least about ⅞ inch.

4. Apparatus as in claim 1 wherein each band includes a plurality of apertures juxtaposed to apertures in the other band and spaced apart therefrom at least about ⅞ inch.

5. Apparatus for making single color cotton candy, said apparatus comprising:
   a candy spinning head mounted for rotation about an axis and having upper and lower spinner elements each including a sugar melting heater and a perforated band disposed externally of said heater;
   a spacer between said elements spacing said elements apart, said spacer comprising a ring having an outer periphery in general register with said bands and an inner surface tapered to direct sugar under the influence of centrifugal force toward each of said respective heaters from said common sugar chamber;
   said elements and said spacer together defining in part a common sugar chamber for receiving sugar and from which sugar is dispensed toward the heater of each element for melting and issuing therefrom as cotton candy;
   said spacer spacing said bands apart not less than about ½ inch.

6. Apparatus for making cotton candy and comprising:
   a spinner head;
   a common chamber in said head for receiving sugar;
   said chamber having upper and lower walls defined by respective perforate bands;
   a heater element disposed in said chamber adjacent each of said bands;
   a spacer spacing said bands apart no less than about ½ inch;
   said chamber operatively communicating with each of said heater elements and supplying sugar from said common chamber when said head is rotated for melting said sugar and for issuing cotton candy from said bands.

7. Apparatus as in claim 6 wherein each band defines a plurality of apertures through which molten sugar from said heater elements issues out of said head, the distance between the apertures in one band, from juxtaposed apertures in another band being at least about ⅞ inch.

8. Apparatus for making single color cotton candy and comprising:
   a spinner head;
   a common chamber in said head for receiving sugar;
   said chamber being defined in part by upper and lower bands having apertures therein;
   a heater element disposed adjacent each band and in said chamber for melting sugar moving to each element from said common chamber; and
   wherein the apertures in each band are spaced apart at least about ⅞ inch from juxtaposed apertures in the other band.

9. Apparatus for making single color cotton candy and comprising:
   a spinner head having a common sugar chamber therein;
   a first series of circumferentially disposed apertures in said head in operative communication with said chamber and through which molten candy can pass;
   a second series of circumferentially disposed apertures in said head in operative communication with said chamber and through which molten candy can pass;
   a heater element operatively positioned with respect to each series of apertures for melting sugar received from said common chamber; and
   wherein the apertures of said first series are juxtaposed to the apertures of said second series and are spaced therefrom at least about ⅞ inch.

10. A method of making single color cotton candy in apparatus having a spinner head and including the steps of:
    pouring single color sugar into a common sugar chamber in said heat;
    spinning said head about an axis;
    separating sugar into axially spaced upper and lower portions thereof in said common sugar chamber upon rotation of said head;
    melting upper and lower portions of sugar received from said chamber at upper and lower peripheral wall areas of said chamber;

issuing sugar outwardly through apertures in both said axially spaced upper and lower wall portions of said chamber at an axial distance of at least about ⅞ inch; and collecting cotton candy issuing from said head.

11. A method as in claim 10 including the step of collecting cotton candy issuing from said apertures in said upper and lower wall portions only after said candy has congealed.

12. A method of making single color cotton candy in apparatus having a spinner head and including the steps of:

pouting single color sugar into a common sugar chamber which is within said head and having both upper and lower peripheral wall areas:

directing sugar from said common chamber toward both upper and lower peripheral wall areas of said chamber:

melting upper and lower portions of sugar received from said chamber at upper and lower peripheral wall areas of said chamber;

issuing sugar from apertures in upper and lower wall portions of said chamber, spaced apart at least ⅞ inch, outwardly of said chamber to form cotton candy; and collecting cotton candy issuing from said head.

13. Apparatus for making single color cotton candy, said apparatus comprising:

a candy spinning head mounted for rotation about an axis and having upper and lower spinner elements each including a sugar melting heater and a perforated band disposed externally of said heater;

a spacer between said elements spacing said elements apart;

said elements and said spacer together defining in part a common sugar chamber for receiving sugar and from which sugar is dispensed toward the heater of each element for melting and issuing therefrom as cotton candy;

said spacer spacing said bands apart not less than about ½ inch;

a sugar feed inlet into said chamber;

a sugar deflecting surface disposed in a common plane with said spacer and operatively aligned with said sugar feed inlet for receiving sugar introduced into said chamber through said feed inlet and for deflecting sugar radially outwardly toward said spacer and toward each of said elements from said common chamber when said head is rotated about said axis.

14. Apparatus as in claim 13 wherein said spacer comprises a ring having an outer periphery in general register with said bands and an inner surface tapered to receive deflected sugar from said deflecting surface and to direct sugar under the influence of centrifugal force toward each of said respective heaters from said common sugar chamber.

15. Apparatus for making single color cotton candy and comprising:

a spinner head having an axis of rotation;

a single common chamber in said head for receiving sugar;

a port in said head operatively communicating with said chamber and through which sugar can be introduced into said chamber;

said chamber being defined in part by upper and lower bands having apertures therein;

a heater element operatively associated with each band and in said chamber for melting sugar moving to each element from said common chamber;

wherein the apertures in each band are spaced apart at least about ⅞ inch from juxtaposed apertures in the other band; and wherein said common chamber is unobstructed between said upper and lower bands.

16. Apparatus as in claim 15 further including a spacer oriented between said bands, wherein said spacer has an inner peripheral surface closely proximate said bands.

17. Apparatus as in claim 15 further including a spacer oriented between said bands, wherein said spacer has an inner peripheral surface disposed closer to said bands than to said axis.

18. Apparatus as in claim 15 further including a spacer oriented between said bands, wherein said spacer has a tapered inner peripheral surface for receiving sugar from said common chamber and for deflecting sugar from said common chamber toward both said upper and lower bands.

19. Apparatus as in claim 18 further including a surface operatively disposed in said common chamber for deflecting sugar in chamber toward said tapered inner peripheral surface and toward both said bands.

20. Apparatus as in claim 15 further including a sugar inlet operatively communicating with said chamber and a sugar deflection plate in said chamber for receiving sugar from said inlet and for deflecting sugar toward both said bands.

21. Apparatus for making single color cotton candy and comprising:

a spinner head having a sugar chamber therein;

a first series of circumferentially disposed apertures in said head through which molten candy can pass;

a second series of circumferentially disposed apertures in said head through which molten candy can pass;

a heater element operatively positioned with respect to each series of apertures for melting sugar received from said chamber;

wherein apertures of said first series juxtaposed to the apertures of said second series are spaced therefrom at least about ⅞ inch;

a sugar inlet operatively communicating with said chamber for feeding sugar into said chamber; and a sugar deflecting plate in said chamber operatively aligned with said inlet for receiving sugar therefrom and for deflecting sugar toward both series of apertures.

* * * * *